United States Patent [19]

Ito et al.

[11] Patent Number: 4,576,472
[45] Date of Patent: Mar. 18, 1986

[54] CONTROL APPARATUS FOR COPYING MACHINE

[75] Inventors: Masazumi Ito, Toyohashi; Tomoji Murata, Toyokawa, both of Japan

[73] Assignee: Minolta Camera Kabushiki Kaisha, Osaka, Japan

[21] Appl. No.: 666,368

[22] Filed: Oct. 30, 1984

[30] Foreign Application Priority Data

Nov. 5, 1983 [JP] Japan .................................. 58-208134
Mar. 1, 1984 [JP] Japan .................................. 59-40216

[51] Int. Cl.$^4$ .............................................. G03B 27/48
[52] U.S. Cl. ..................... 355/50; 355/3 SH; 355/14 SH; 355/66
[58] Field of Search .................. 355/50, 51, 66, 3 SH, 355/14 SH

[56] References Cited

U.S. PATENT DOCUMENTS 4,281,919  8/1981  Nomura et al. ....................... 355/50
4,444,382  4/1984  Ishikawa et al. ..................... 271/10

Primary Examiner—Monroe H. Hayes
Attorney, Agent, or Firm—Watson Cole Grindle & Watson

[57] ABSTRACT

The invention disclosed relates to a copying machine to which an automatic document feeder is attachable. A control apparatus therefor according to the present invention operates in the following control modes: When a document is placed on a document support table at the time a print key is depressed, a copying cycle is started without operating an automatic document feeder. When there is no document on the document support table and a document is set in the ADF, the ADF is operated to start a copying cycle in an ADF mode. When no document is placed on the document support table and no document is set in the ADF, no copying cycle is commenced.

3 Claims, 18 Drawing Figures

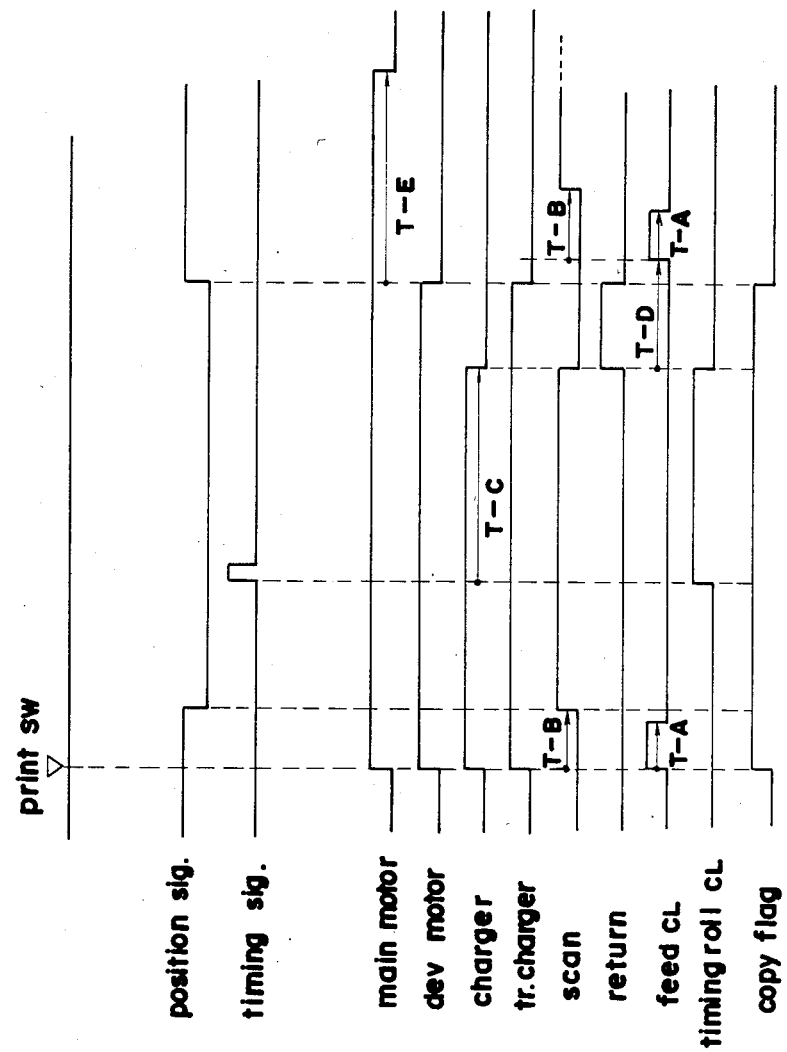

CONTROL APPARATUS FOR COPYING MACHINE

BACKGROUND OF THE INVENTION

1. Field of the Invention

The present invention relates to a control apparatus for a copying machine with an automatic document feeder incorporated therein.

2. Description of the Prior Art

There has been proposed a copying machine of the type in which an original document in the form of a sheet is placed on a transparent document support table, and an image of the document is projected onto and formed on a photosensitive body upon exposure. The proposed copying machine incorporates therein an automatic document feeder (ADF) for automatically feeding the sheet document toward a prescribed position on the transparent document support table. The copying machine is controlled in a certain operative relationship to the ADF so that a copying operation will be started in response to a signal indicating that the document has been fed to and stopped in the prescribed position on the document support table.

In operation of such a copying machine, when the ADF is to be used, an ADF start switch is turned on. When the ADF is not to be used, an ordinary print switch is turned on to start reproducing the document. One disadvantage with the copying machine having the ADF is that these switches tend to be operated upon in error by a user who is unused to the practice of operating the copying machine. For example, if the print switch is turned on regardless of the fact that a document is set in the ADF, then a copying cycle is initiated when the document is not fed onto the document support table. As a result, a copy with no image thereon is produced. If the ADF switch is turned on when a document is placed on the document support table by the user, then the document will be discharged by the ADF.

SUMMARY OF THE INVENTION

It is a primary object of the present invention to provide a control apparatus for a copying machine with an automatic document feeder, which control apparatus can ascertain whether there is a document on a document support table or not to thereby prevent an unnecessary copying operation from being initiated.

Another object of the present invention is to provide a control apparatus for a copying machine, which, when an automatic document feeder is in use, starts operation of the ADF while a certain condition is met at the time a print key on the copying machine is depressed, so that the copying machine will be prevented from starting operation while no document is on a document support table.

Still another object of the present invention is to provide a control apparatus for a copying machine having an automatic document feeder, which control apparatus has a simple arrangement and operates in a simple control mode for avoiding any unwanted copying operation.

To achieve the above objects, a control apparatus according to the present invention operates in the following control modes: When a document is placed on a document support table at the time a print key is depressed, a copying cycle is started without operating an automatic document feeder. When there is no document on the document support table and a document is set in the ADF, the ADF is operated to start a copying cycle in an ADF mode. When no document is placed on the document support table and no document is set in the ADF, no copying cycle is commenced.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13 is a timing chart illustrative of operation of the copying machine; and

DESCRIPTION OF THE PREFERRED EMBODIMENTS

Figure 1:
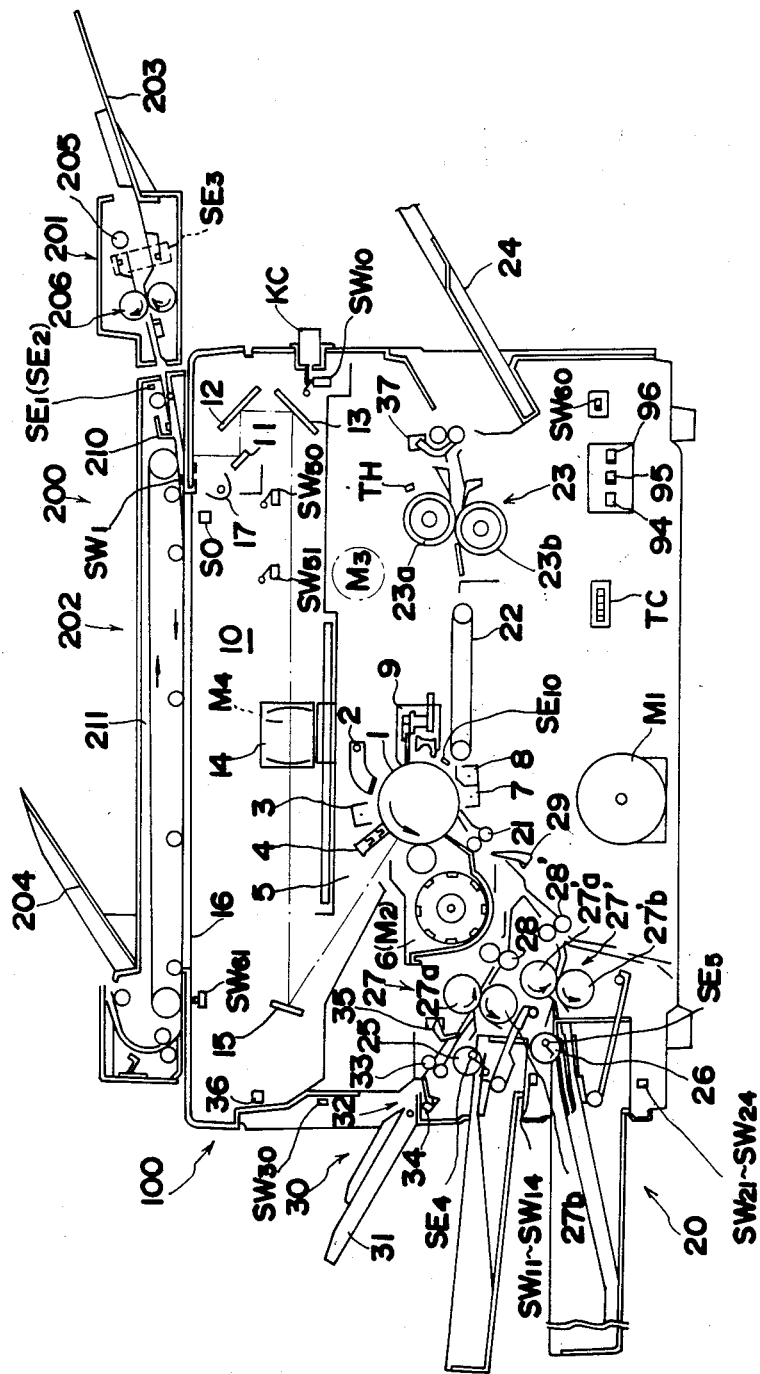
FIG. 1 is a cross-sectional view of a copying machine having a control apparatus and an automatic document feeder.

FIG. 1 schematically shows a copying machine having a control apparatus according to a first embodiment of the present invention. The arrangement and operation of the copying machine will first be described briefly.

The copying machine, generally designated at 100, has a photosensitive drum 1 disposed substantially centrally in the copying machine and rotatable counterclockwise (FIG. 1). The copying machine 100 also includes an eraser lamp 2, a charging charger 3, an image end and inter-image eraser 4, a developing unit 6, a transfer charger 7, a separation charger 8, and a cleaning unit 9, all disposed successively around the photosensitive drum 1. The photosensitive drum 1 has a photosensitive surface layer which will be uniformly charged as it moves past the eraser lamp 2 and the charging charger 3. An electrostatic latent image is formed on the surface of the photosensitive surface layer when the latter is exposed to an optical image of a document applied through a slit 5 from a scanning optical system 10.

The optical system 10 is disposed below a document support table 16 comprising a panel of glass, and is composed of a light source 17, movable mirrors 11, 12, 13, a lens 14, and a mirror 15. The light source 17 and the movable mirror 11 are movable in unison to the left at a speed of v/m (v: peripheral speed of the photosensitive drum 1, which is constant at all times regardless of how copied images are magnified in size, m: magnification of copied images). The movable mirrors 12, 13 are movable in unison leftward at a speed of v/2m.

A sensor SO is disposed below the document support table 16 in the vicinity of a document reference position for detecting whether there is a document placed on the document support table 16. The sensor SO may comprise a reflective photosensor, for example, fixed to the optical system 10. The manner in which a document is detected by such a reflective photosensor will not be described in detail as various arrangements for such optical detection have been proposed and practiced in the art.

Sheets of copying paper are supplied from an automatic sheet feeder mechanism 20 having two upper and lower cassettes located on a lefthand side of a body of the copying machine 100 or a manual sheet feeder mechanism 30 located upwardly of the automatic sheet feeder mechanism 20. One of the sheets is fed at a time into an image transfer section in synchronism with formation of an image on the photosensitive drum 1 after the sheet has once been stopped by a timing roller assembly 21. Thereafter, a toner image is transferred to the sheet by the transfer charger 7, and then the sheet bearing the toner image is peeled off the surface of the photosensitive drum 1 by the separation charger 8. The sheet is fed by a delivery belt 22 into a fixing unit 23 in which the toner image is fixed to the sheet, which is finally discharged onto a tray 24.

After the toner image has been transferred from the photosensitive drum 1 to the sheet, any residual toner and electric charges are removed from the photosensitive drum 1 by the cleaning unit 9 and the eraser 2. The photosensitive drum 1 is now ready for a next copying cycle.

In an automatic sheet feeding mode, a print key PSW (FIG. 3) for starting a copying operation of the copying machine 100 is actuated to start an image forming system including the photosensitive drum 1. When a preliminary driving process for the photosensitive drum 1 is finished, a sheet feed roller 25 or 26 is driven to feed sheets, and the scanning optical system 10 starts to be driven in response to a scanning start signal issued upon feeding of the sheets. A sheet is fed along in synchronism with image forming operation. Two or three sheets are first fed out by rotation of the sheet feed roller 25 or 26, and an uppermost sheet is delivered by a succeeding shuffling mechanism 27 or 27' to an intermediate roller assembly 28 or 28', which is controlled in coaction with the timing roller assembly 21.

The copying machine 10 can be combined with an automatic document feeder (ADF) 200 for coaction therewith in copying operation. When a switch SW1 detects that the ADF 200 is electrically connected to the body of the copying machine 100 and positioned in place, the ADF 200 and the copying machine 100 can be controlled in coaction with each other for an ADF mode. In the ADF mode, when the print key PSW is actuated while a document set on a document tray 203 is detected by a sensor SE3, the copying machine 100 is kept in a standby condition while the ADF 200 starts operating to feed the document from the document tray 203 along the document support table 16 toward a prescribed position thereon, and then issues a start signal to the copying machine 100 to enable the latter to start the copying operation as described above. After final scanning over the document is brought to an end, the copying machine 100 applies an operation signal to the ADF 200 to cause the latter to discharge the document onto a discharge tray 204. If there is a next document on the document tray 203 at this time, then the next document is delivered to the prescribed position on the document support table 16 at the same time that the previous document is discharged.

The ADF 200 generally comprises a document supply unit 201 for supplying one at a time of stocked documents, and a document feed unit 202 for feeding a document by sandwiching the same between itself and the document support table 16, for stopping the document at the prescribed position on the document support table 16, and for discharging the document from the document support table 16 onto the discharge tray 104. The document feed unit 202 can be used as a separate manual document feed device. The document feed unit 202 as it is mounted on the upper surface of the copying machine 100 is openable and closable with respect to the body of the copying machine 100 and hence can be as an ordinary document cover, so that the document support table 16 can selectively be exposed for access. The opening and closing of the document feed unit 202 can be detected by the switch SW1.

Figure 2:
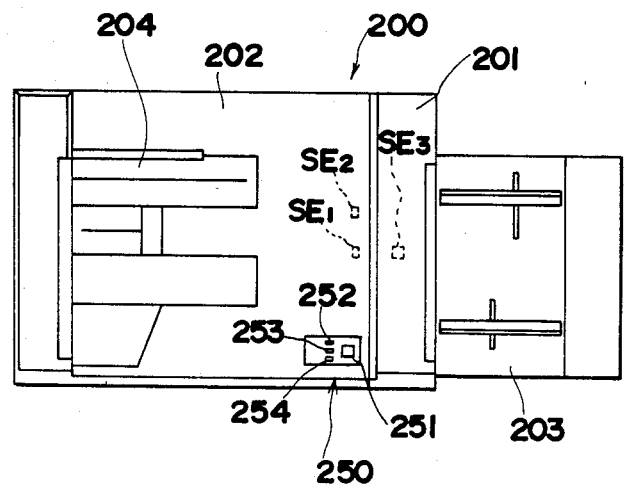
FIG. 2 is a plan view of the automatic document feeder.

As shown in FIG. 2, the ADF 200 has a control pad 250 and a sensor combination. The control pad 250 is mounted on an upper surface of the document feed unit 202 and has a mode setting key 251 and mode indicator lamps 252, 253, 254. The mode indicator lamps 252, 253, 254 are successively energized when the mode setting key 251 is successively actuated to effect switching among "automatic sheet selection", "automatic magnification selection", and "manual" modes.

The sensor combination is disposed in the vicinity of a document insertion slot in the document feed unit 202, and comprises a document length sensor SE1 positioned for detecting a document regardless of the size and orientation of the document to be inserted, and a document width sensor SE2 for sensing two conditions of detection and non-detection dependent on the width of the document. The size and orientation of the document can be identified by signals from these two sensors.

The copying machine 100 having the foregoing copying mechanism includes actuation and control mechanisms, described below, for effecting control modes dependent on statuses of various sensors and input switches.

Figure 3:
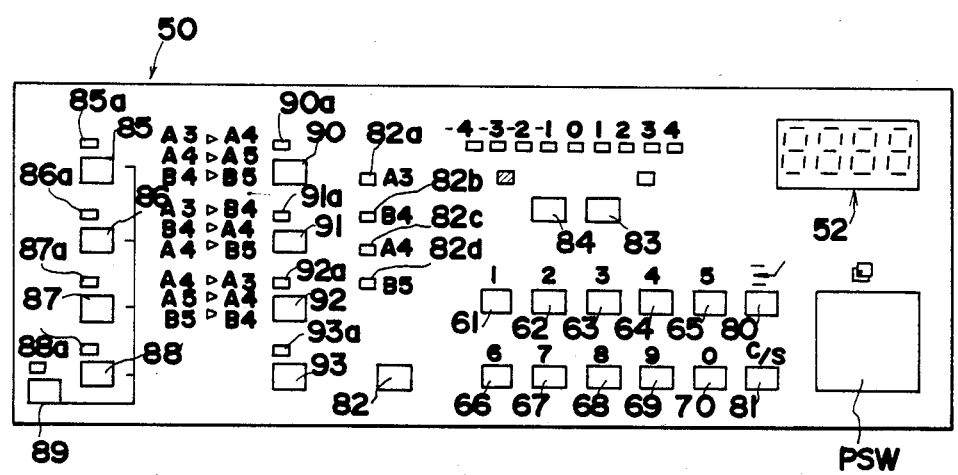
FIG. 3 is a plan view of a control panel of the copying machine.

FIG. 3 illustrates control keys as arranged on a control panel 50 of the copying machine. The control panel 50 has the print key PSW for starting copying operation, a numerical indicator 52 for indicating up to four figures, a ten-key cluster composed of keys 61 through 70 corresponding to numbers "1", "2", ..., "9", "0", respectively, an interrupt key 80 for commanding interrupt copying, a clear/stop key 81, a sheet selection key 82 for selecting, by size, one of sheet stacks, up and down keys 83, 84 for changing or selecting densities of copied images stepwise, and keys 85 through 93 for setting copying magnifications. The keys are associated respectively with normally-open changeover switches, which will be indicated by the reference numerals or characters allotted to the keys in a circuit diagram, described later.

Figure 4:
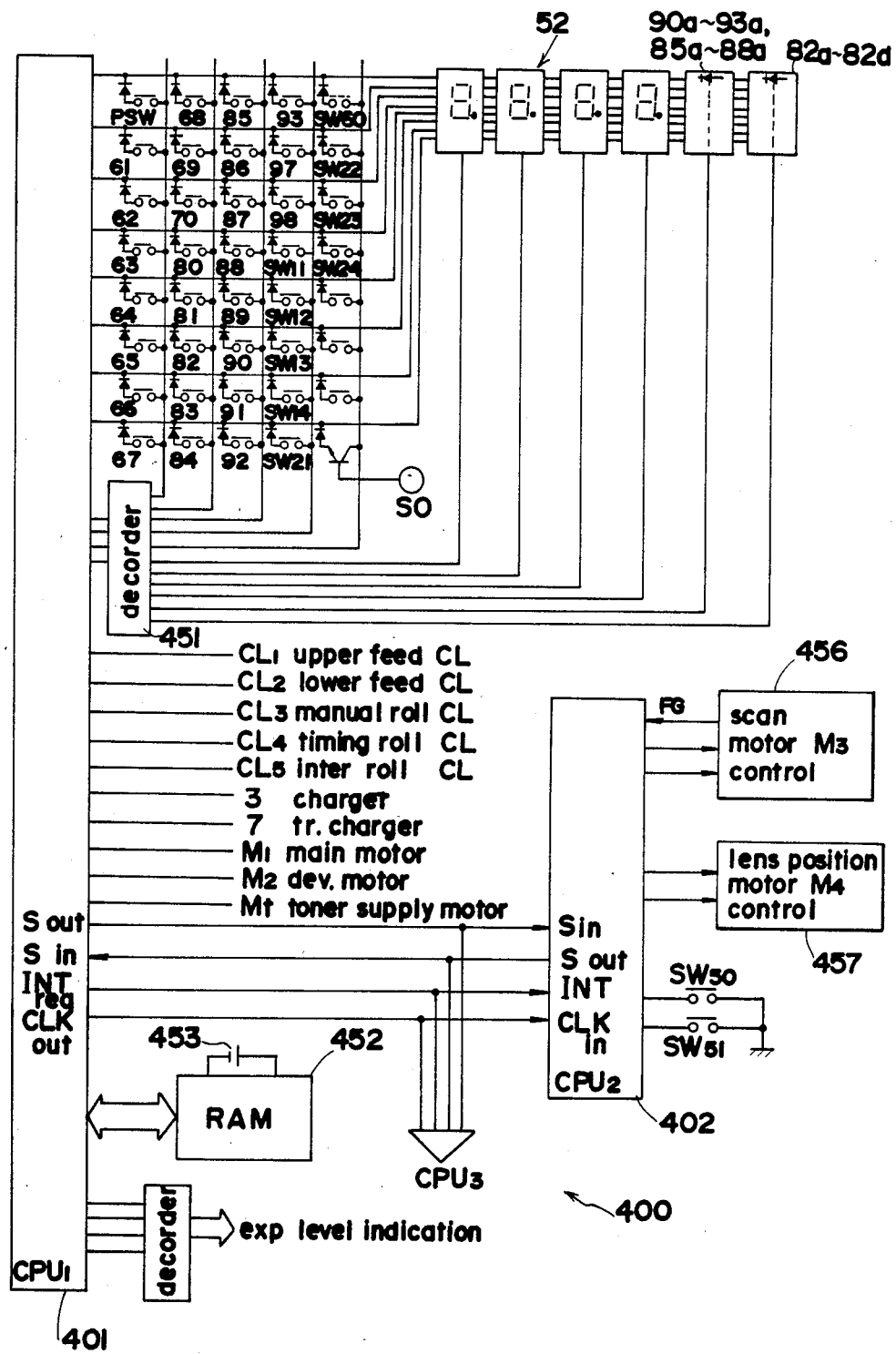
FIG. 4 is a circuit diagram of a central processing unit (CPU) for the control apparatus and its inputs and outputs.
Figure 5:
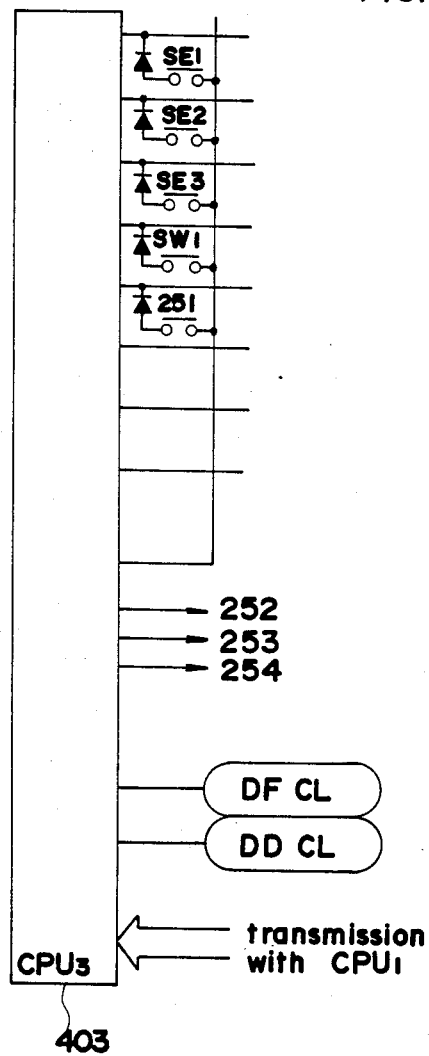
FIG. 5 is a circuit diagram of a central processing unit (CPU) for controlling the automatic document feeder and its inputs and outputs.

The switches combined with these input or control keys and various sensors in the copying machine 100 and the ADF 200 are operatively connected to a control mechanism 400 including a computer system as shown in FIGS. 4 and 5.

FIGS. 4 and 5 illustrate microprocessors or central processing units (hereinafter referred to as "CPU") 401 through 403 in the control mechanism 400 and inputs and outputs thereof. The CPU 401 is a master or first CPU for effecting primary control, and has a serial output terminal Sout connected to serial input terminals Sin of slave CPUs 402, 403, a serial input terminal Sin connected to serial output terminals Sout of the slave CPUs 402, 403, an interrup request terminal INTreq connected to an interrupt terminal INT of each slave CPU, and a clock output terminal CLKout connected to a clock input terminal CLKin of each slave CPU. The interrupt terminal INTreq of the master CPU 401 goes high at a prescribed period, and the serial output terminal Sout feeds in synchronism with the period data blocks containing data to be transferred to the slave CPUs 402, 403 successively onto a bus line in response to a clock signal. Each CPU 402, 403 receives the data through the serial input terminal Sin at the timing of "H" assigned to itself, and issues the data via the serial output terminal Sout in response to the clock signal. When the terminal INTreq of the master CPU 401 is high, each slave CPU 402, 403 processes the read data, writes new data into a register or the like, and waits for the terminal INTreq of the master CPU 401 to go high.

The master CPU 401 is disposed in the body of the copying machine 100, and connected through a decoder 451 to the keys and the indicator 52 on the control panel 50. The master CPU 401 effects determines key inputs, and controls numerial values to be indicated and outputs indicated by light-emitting diodes, and issues signals for controlling copying operation. A RAM 452 is backed up by a battery 453 and stores variable data to be kept after a power supply is turned off.

The slave CPU 402 serves to control the optical system 10. The slave CPU 402 is supplied with magnification data from the master CPU 401 for issuing control signals to a speed control circuit 456 for a DC motor M3 for scanning drive and a drive control circuit 457 for a step motor M4 for positionally controlling the lens and mirrors. The slave CPU 402 also discriminates outputs from an exposure start switch SW50 and a timing switch SW51 which are operated as the scanning system moves.

FIG. 5 shows the slave CPU 403 for controlling the ADF and its inputs and outputs. The ADF control CPU 403 is disposed within the ADF 200 and connected to the mode setting key 251, the switch SW1 for detecting whether the document feed unit is opened or closed, a sensor SE3 for detecting whether a document is set, and the document sensors SE1, SE2. The ADF control CPU 403 issues signals for controlling energization of the indicator lamps 252, 253, 254 and the feeding and discharging of documents to be copied.

Figure 6A:
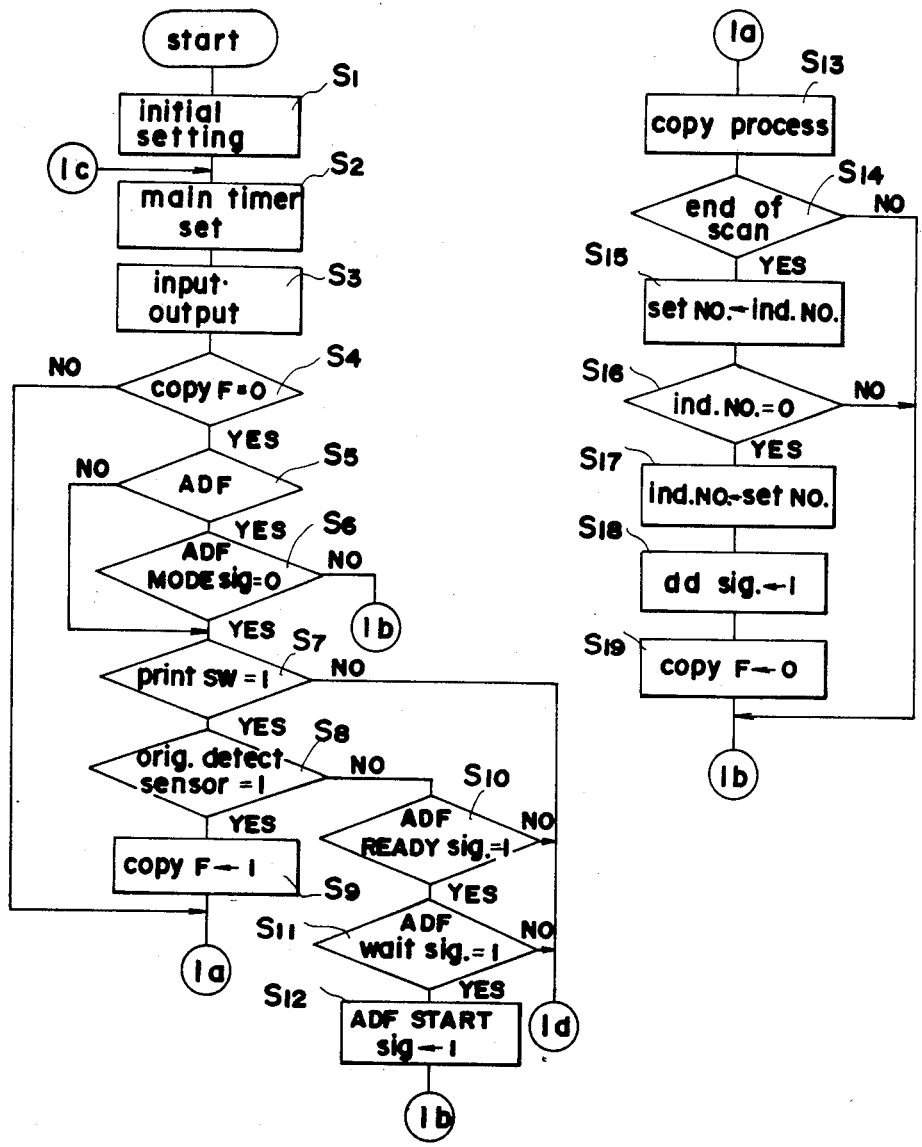
FIGS. 6a, 6b, 7a, 7b, and 8 are flowcharts of steps of control operation executed by a master CPU.
Figure 6B:
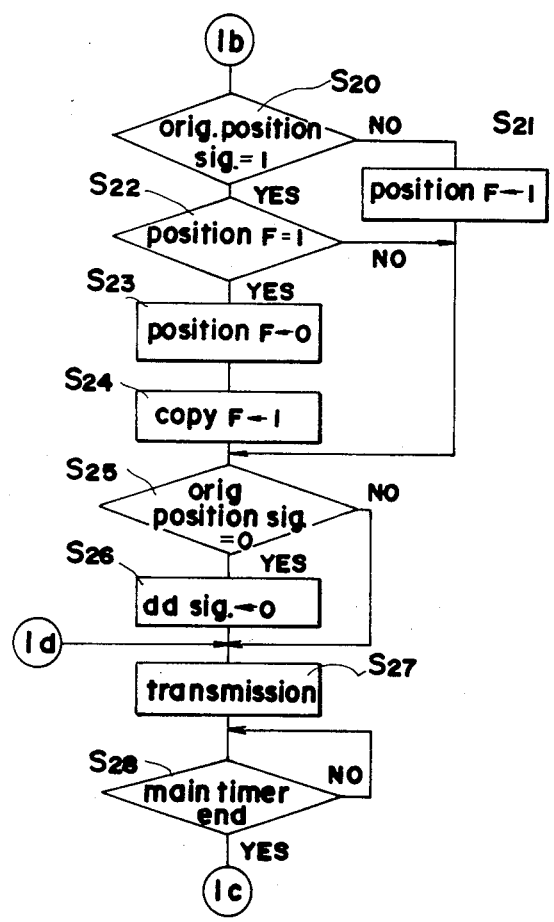

FIGS. 6a and 6b show flowcharts of successive steps of control operation of the master CPU 401.

In a step S1, each flag is reset, and data items on the set number of copies, a sheet feed inlet, and a copying magnification are initialized. Then, a timer is set in a step S2 to determine the length of one routine. The timer may be a timer in the master CPU 401 or an external timer.

In a step S3, inputs from the ten-key cluster and external switches are entered, and outputs are issued to the motors solenoids and indicators.

A step S4 determines whether a copy flag is "0" or not. If the copy flag is "0" or the copying machine is not in a copying mode, then the program goes to a step S5. If the copy flag is "1" or the copying machine is in a copying mode, then the program jumps to a step S13.

The step S5 determines whether the ADF 200 is mounted or not. The ADF 200 may be determined as being not mounted when a communication signal from the ADF 200 is not received. Alternatively, whether the ADF 200 is mounted or not may be determined by the switch SW1 which is actuated when the ADF 200 is mounted.

If the ADF 200 is mounted, then a step S6 determines whether an ADF MODE signal is "0" or not. The ADF MODE signal is "1" when a copying operation is effected using the ADF 200. If the ADF 200 is in operation, then a step S7 inhibits a signal from the print key PSW. If the ADFMODE signal is "1", then the program jumps to a step S20, and if the ADFMODE signal is "0", then the program proceeds to the step S7.

The step S7 determines whether the pring key PSW is depressed or not. If depressed, then a step S8 determines whether there is a document or not on the document support table 16 based on a signal from the sensor SO. If there is a document, then a step S9 sets the copy flag to "1", and a copying cycle is carried out in a step S13. If there is no document, then the program goes to a step S10 which determines if the document feed unit 202 is closed on the upper surface of the body of the copying machine 100 based on a signal from the switch SW1. If closed, then a step S11 determines whether a document is placed on the document tray of the ADF 200 based on a signal from the sensor SE3. If a document is on the document tray, then a step 12 issues an ADF START signal to start operation of the ADF 200, and then the program goes to the step S20. If decisions in the steps S7, S10, and S11 are NO, the program jumps to a step 27.

When the copying cycle is completed in the step S13, the program goes to a step S14 which determines whether the optical system has completed a scanning process. If a scanning process has been completed, then a step S15 decrements the indicated number of copies by one, and if a scanning process has not yet been finished, then the program goes to a step S20.

After the indicated number of copies is decremented in the step S15, the program goes to a step S16 which determines whether the indicated number of copies is "0" or the set number of copies have already been reproduced. If the set number of copies have already been reproduced, a step S17 indicates the set number of copies, and then a step S18 sets a document discharge signal to "1" to command the ADF 200 to discharge a next document. Thereafter, the copy flag is reset to "0" in a step S19 so as to be ready for a next copying cycle.

In the step S12, the ADF START signal is set to "1" to actuate the ADF 200, and if the step S20 determines that a document is transferred to the prescribed position on the document support table 16, then the program goes to a step S22 to determine whether a position flag is "1" or not for thereby detecting a positive-going edge of a document position signal, or a time when the document reaches the prescribed position. If the document arrival is detected, then the position flag is reset to "0" in a step S23, and the program proceeds to a step S24 in which the copy flag is set to "1" to start a copying cycle.

If the ADF MODE signal is "1" in the step 6 thus determining that the ADF 200 is in use, the program also goes to the step S20 to determine the document position signal which will be "1" if a document is in the prescribed position on the document support table 16. If the document position signal is not "1", then the position flag is set to "1" in a step S21, and the program goes to a step S25. If the document position signal is "1" in the step S20, the program proceeds to the step S22 which sees if the position flag is "1" or not. If the position flag is not "1", then the program proceeds to the step S25.

The step S25 ascertains whether the document position signal is "0" or not. If the document position signal is "0" indicating that there is no document on the document support table 16, then the document discharge signal is rest to "0" in a step 26 and then the program goes to a step S27. If there is a document on the document support table 16, then the program goes from the S25 directly to the S27.

In the step S27, data items are transmitted to and received from the ADF 200 in an interrupt mode by the master CPU 401.

Then, a step S28 determines whether the time set by the timer has elapsed or not. If elapsed, then the program goes back to the step S2. If not elapsed, then the step S28 is reapeated to adjust the length of one routine.

An operation flow of the ADF 200 will now be described.

Figure 7A:
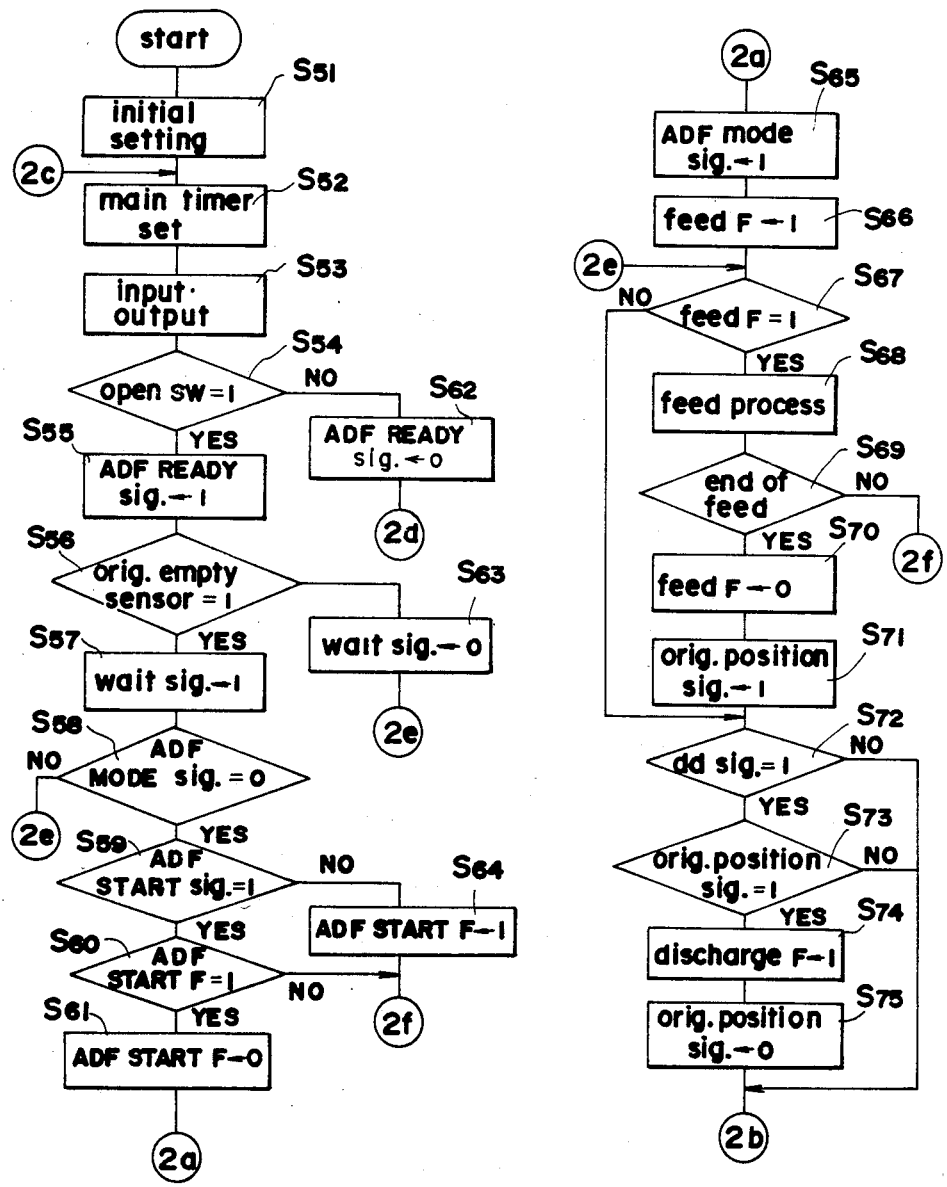
Figure 7B:
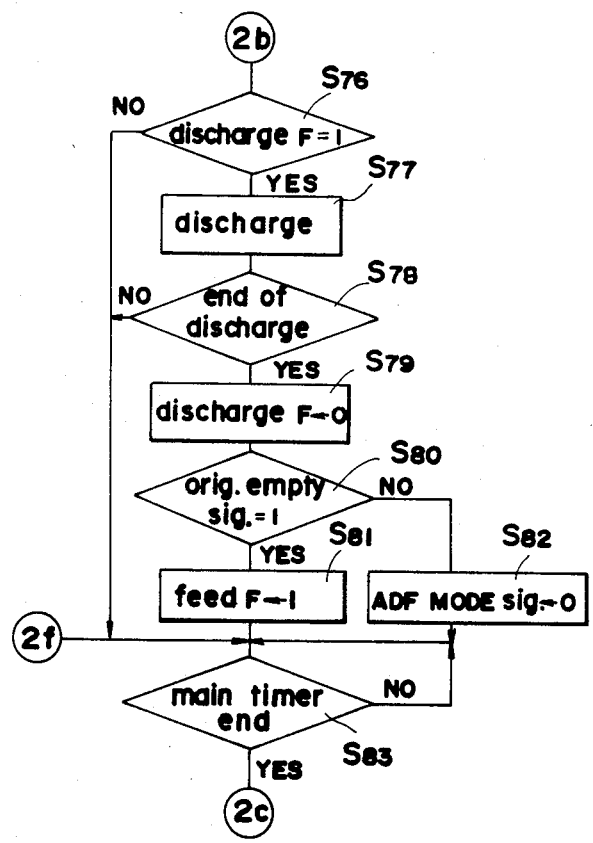
Figure 8:
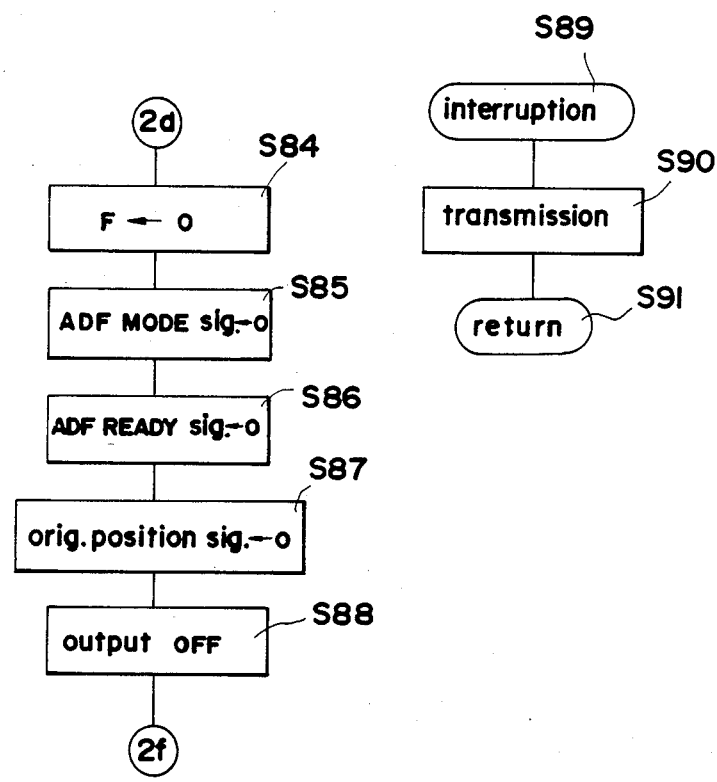

In FIGS. 7a and 7b, a step S51 effects initialization, a step S52 sets the timer to the length of one routine, and a step S53 receives various inputs and issues various outputs. A step S54 determines whether the switch SW1 is closed, that is, whether the document feed unit 202 is set on a platen to allow the ADF 200 to operate. If the switch SW1 is closed, then a step S55 sets an ADF READY signal to be applied to the master CPU 401 to "1", and the program goes to a step S56. If the switch SW1 is not closed, then a step S62 resets the ADF READY signal to "0", and the program jumps to a step S84 (FIG. 8).

The step S56 detrmines whether there is a document on the document tray 203 of the document supply unit 201. If there is no document, a document ready signal is set to "0", and the program goes to a step S63. The document ready signal is transmitted to the master CPU 401 to indicate whether a document is set on the document tray 203.

If there is a document on the document tray 203, then the document ready signal is set to "1" in a step S57, and the program goes to a step S58 which determines whether the ADF MODE signal to be transmitted to the master CPU 401 is "0" or not, that is, whether the ADF 200 is ready or not. If the ADF MODE signal is "1", then the program goes to a step 67, and if "0", then the program goes to a step S59. The step S59 determines whether an ADF START signal from the master CPU 401 is "1" or not, that is, whether operation of the ADF 200 is to be started or not. If the ADF START signal is "0", then a step S64 sets an ADF START flag to "1", and the program goes to a step S83. If the ADF START signal is "1", then the program goes to a step S60.

The step S60 determines whether the ADF START flag is "1" or not. If the ADF START flag is "0", then the program goes to the step S83. If the ADF START flag is "1", then a step S61 resets the ADF START signal to "0", a step S65 sets the ADF MODE signal to be fed to the master CPU 401 to "1", and a step S66 sets a sheet feed flag to "1". The sheet feed flag is a request flag for feeding a sheet in a step S68.

A step S67 determines whether the sheet feed flag is "1" or not. If the sheet feed flag is "0", then the program goes to a step S72, and if the sheet feed flag is "1", then the step S68 effects a series of control steps to feed a sheet. Then, a step S69 determines whether sheet feeding has been completed, that is, whether a sheet has been fed to a prescribed position on the platen. If no sheet is fed to the prescribed position, then the program goes to the step S83. If there is a sheet in the prescribed position, then the sheet feed flag is reset to "0" in a step S70, the document position signal to be fed to the master CPU 401 is set to "1", and the program goes to a step S72.

The step S72 determines whether the document discharge signal from the master CPU 401 is "1", that is, whether a copying cycle is completed and there is a document discharge request or not. If the document discharge signal is "1", then a step S73 determines whether the document position signal is "1", that is, whether there is a document on the platen. If the document discharge signal is "0", then the program jumps to a step S76. If the document position signal is "1", then a step S74 sets a document discharge flag to "1", and a step S75 resets the document position signal to "0". The discharge flag serves as a request flag to indicate whether the document is to be discharged from the platen in a step S77. The step S76 determines whether the document discharge flag is "1". If the document discharge flag is "1", then the step S77 effects a series of control steps to discharge the document, and the program goes to a step S78. If the document discharge flag is "0", then the program goes to the step S83.

The step S78 determines whether a document discharge process is completed or not. If not, the program goes to the step S83, and if yes, a step S79 resets the document discharge flag to "0", and a step S80 determines whether a document empty signal is "1" or not, that is, whether there is a codument on the document tray 203. If the document empty signal is "1", then the sheet feed flag is set to "1", and a next copying cycle is initiated. If the document empty signal is "0", then the ADF MODE signal is reset to "0" in a step S82, and operation of the ADF 200 is brought to an end.

If the signal from the switch SW1 is "0", that is, the document feed unit 202 is open in the step S54, then all flags are reset to "0" in a step S84. The ADF MODE signal is reset to "0" in a step S85, the ADF READY signal is reset to "0" in a step S86, the document position signal is reset to "0" in a step S87, and outputs for the motors and solenoids are turned off, whereupon the program goes to a step S88.

The step S83 determines whether the timer set in the step S52 is inactivated or not. If yes, then the program goes back to the step S52, and if not, then the step 83 is repeated.

The program goes to a step S89 from the main routine upon an interrupt command from the master CPU 401. After data items are transmitted and received in a step S90, the program returns to the main routine in a step S91.

According to the first embodiment of the present invention, as described above, when a document is placed on the document support table, a copying operation is commenced without actuating the ADF. When no document is placed on the document support table and there is a document set in the ADF, the ADF is operated to start a copying cycle in the ADF mode. When there is no document placed on the document support table and there is no document set in the ADF, then no copying cycle is initiated. Therefore, a copying operation on the copying machine only and a copying operation in the ADF mode can be started only by the single print key which will be prevented from being operated upon in error. When any copying cycle is started, a document is always set on the document support table or in the ADF. As a consequence, there is no possibility to produce a blank copy with no image thereon. When another document is placed on the document support table and the print key is depressed upon an interrupt while a document is set in the ADF, the ADF will not be actuated, but the document on the document support table starts to be copied. Therefore, no complex interrupt control is needed.

A second embodiment of the present invention will hereinafter be described. Like or corresponding parts in the second embodiment are denoted by like or corresponding reference characters in the first embodiment, and will not be described in detail.

Figure 9:
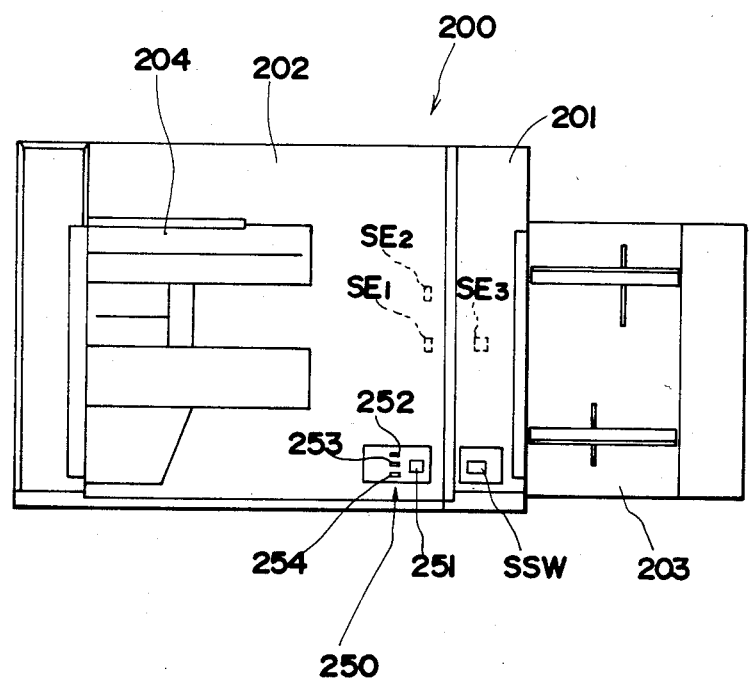
FIG. 9 is a plan view of an automatic document feeder according to a second embodiment of the present invention.

According to the second embodiment, an ADF combined with the copying machine illustrated in FIG. 1 has a copy start key SSW as shown in FIG. 9. In operation, if the switch SW1 detects that the ADF is mounted in place, operation of the copying machine is switched to the ADF mode. The ADF mode is executed such that when the copy start key SSW on the ADF 200 is operated upon while a document on the document tray 203 is detected by the sensor SE3, the ADF 200 starts operation while the copying machine 100 remains inoperative, for feeding the document from the document tray 203 onto the document support table 16 until the document is stopped in the prescribed position thereon, whereupon the ADF 200 issues a start signal to the copying machine 100 to start the copying cycle. When final scanning on the document is completed, the ADF 200 discharges the document onto the discharge tray 204. If there is another document on the document tray 203 at this time, then this document is fed to the prescribed position on the document support table at the same time the previous document is discharged.

In the second embodiment, there is no sensor SO for detecting whether there is a document or not. The second embodiment is therefore different from the first embodiment in that the copy start key SSW is added and no sensor SO is present in FIGS. 1 through 5, more specifically, the copy sensor SO should be omitted from FIG. 4, while the copy start key SSW should be added to FIG. 5. The other arrangement of the second embodiment is the same as the arrangement of the first embodiment.

Control operation for the second embodiment will be described.

Figure 10:
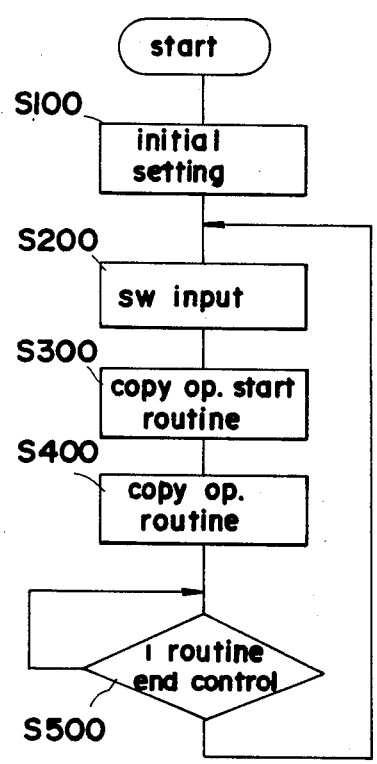
FIG. 10 is a flowchart of steps of control operation executed by the master CPU according to the second embodiment of the present invention.

FIG. 10 is a flowchart of major control steps to be executed by the master CPU 401.

In FIG. 10, a step S100 effects an initialization process at the time a power supply is turned on. The initialization process includes reading variable standard data items of operation modes from the ROM into the RAM, and setting them in given areas in the RAM, such for example as "number of copies=1", "copying magnification=1", and "exposure level=standard", and resetting other RAMs and registers and flags in the CPU 401.

In a step S200, various inputs from control and detection switches are entered.

Figure 11:
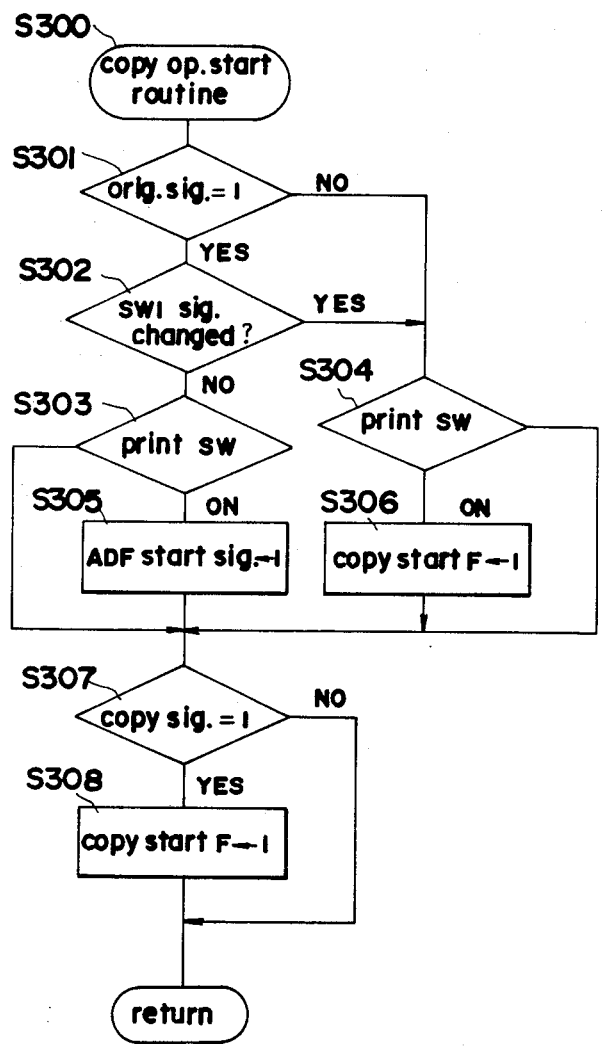
FIG. 11 is a flowchart of a copying operation starting routine in the flowchart of FIG. 10.

A step S300 is a subroutine for starting operation of the copying machine 100, and is shown in detail in FIG. 11.

Figure 12A:
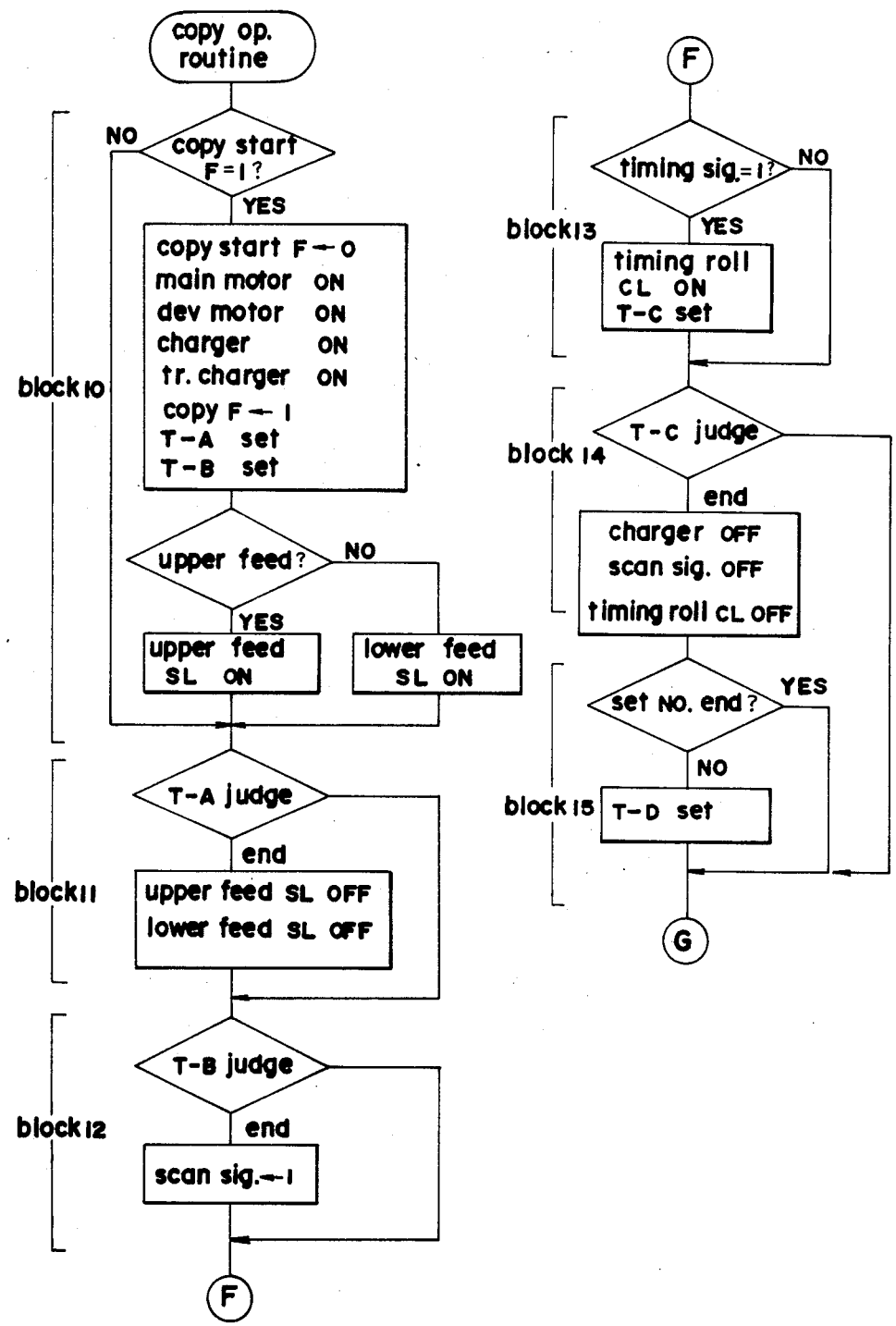
FIGS. 12a and 12b are a flowchart of a copying operation routine in the flowchart of FIG. 10.
Figure 12B:
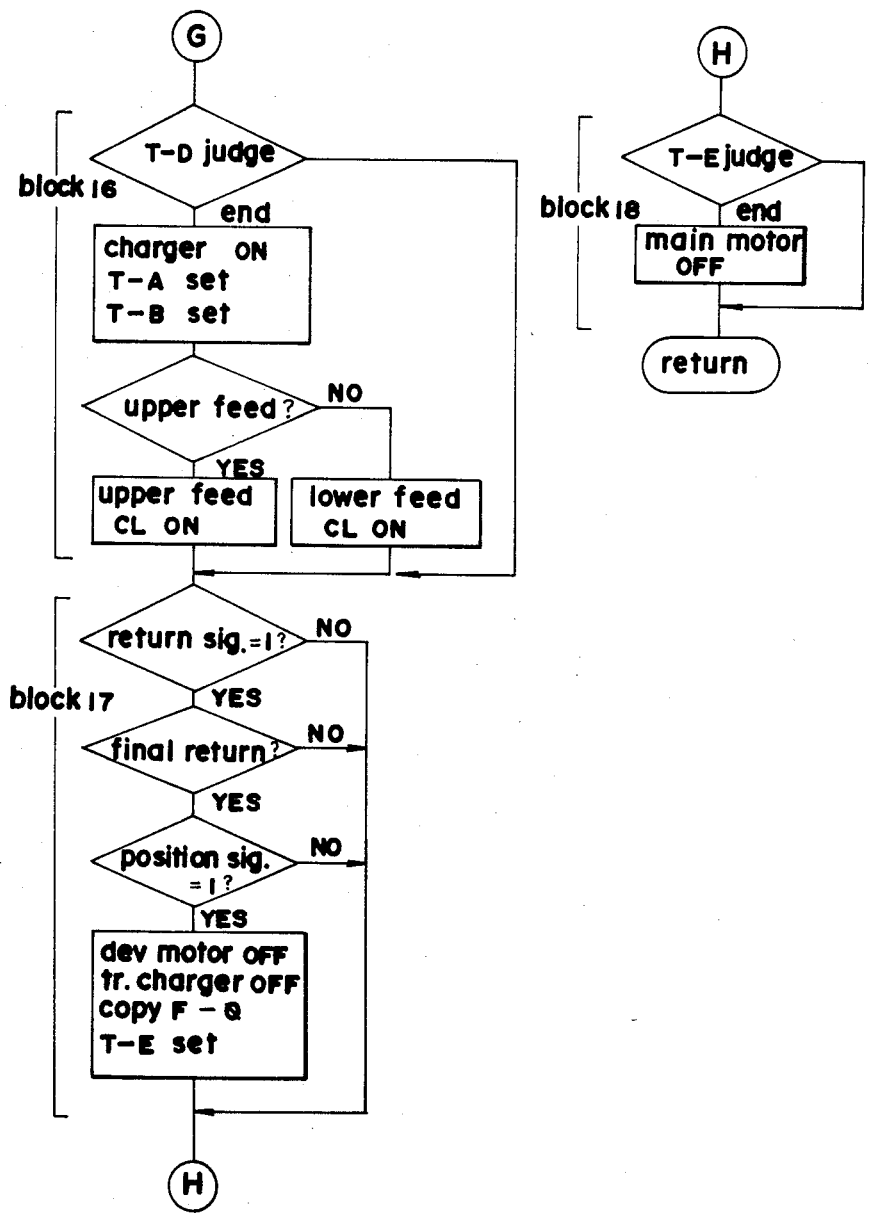

A step S400 is a subroutine for controlling operation of the copying machine 100, and is shown in detail in FIGS. 12a and 12b.

A step S500 is a decision step controlling an end of the main routine shown in FIG. 10. Upon elapse of each of given time intervals, the program goes from the step S500 back to the step S200 to thereby perform repeated processing.

Figure 14A:
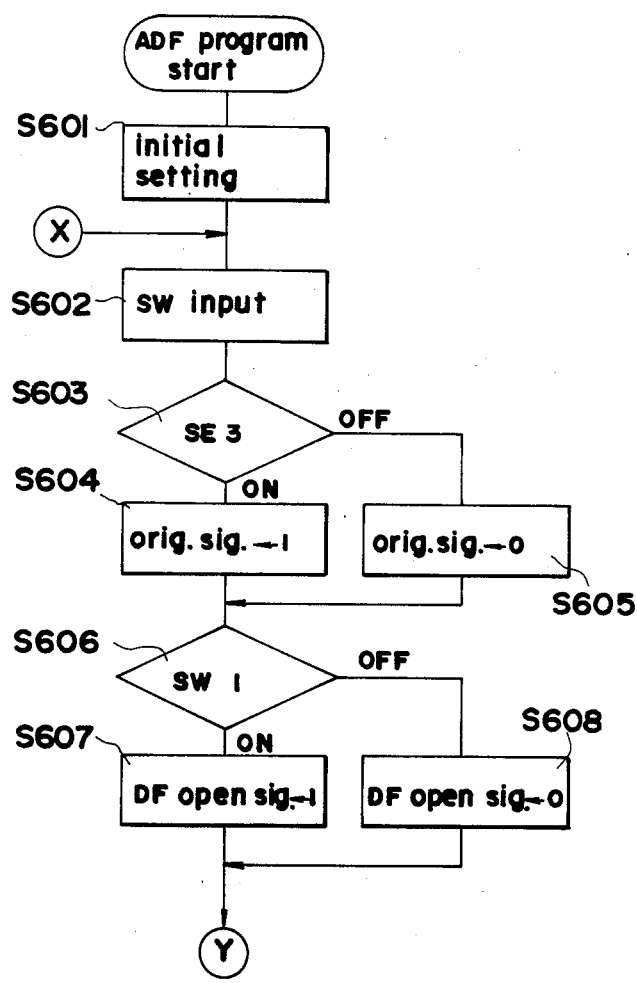
FIGS. 14a and 14b are a flowchart of steps of control operation executed by the CPU for controlling the automatic document feeder.
Figure 14B:
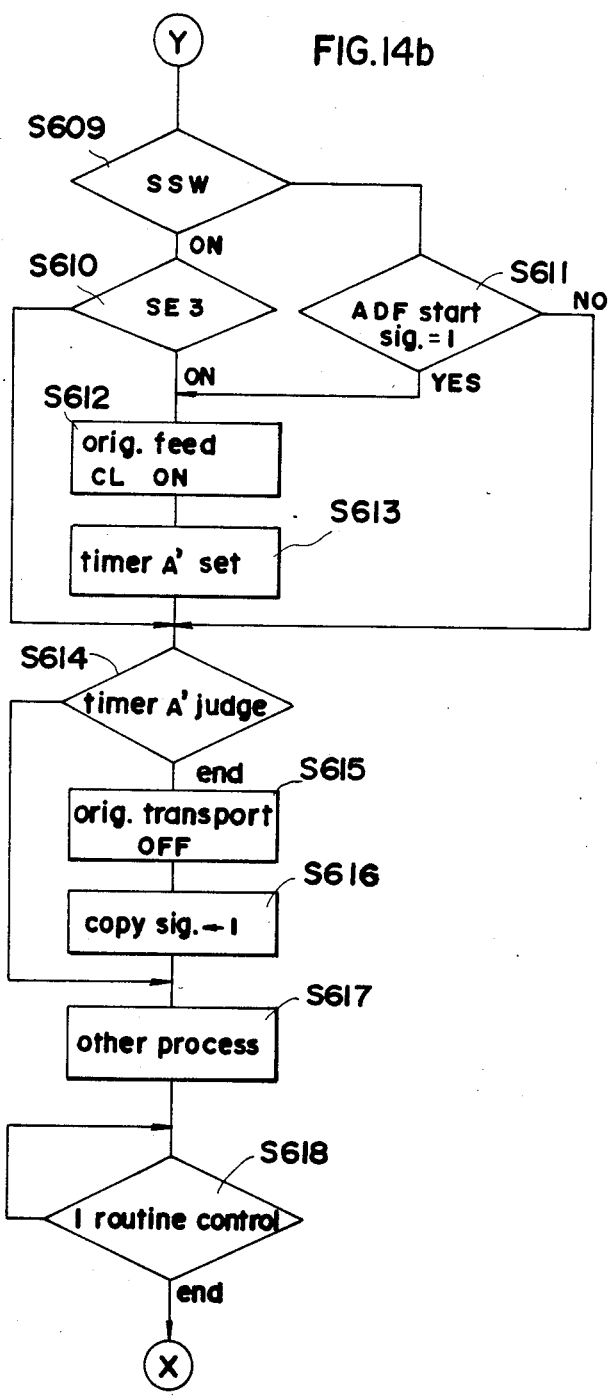

FIG. 11 shows the step S300 in the detailed subroutine containing conditions for starting operation of the copying machine 100. More specifically, a step S301 determines whether a document is set on the document tray 203 based opn a signal from the slave CPU 403 for controlling the ADF. A step S302 determines whether the switch SW1 for detecting opening and closing of the document feed unit 202 has been switched over based on a signal from the CPU 403. If no document is set in the step S301 or if the switch SW1 is switched over, then the program goes to a step S304. If the print key PSW is operated upon in the step S304, then the copy start flag is set to "1" in a step S306. If a document is set in the step S301 and if the switch SW1 is not switched over, then the program goes to a step S303. If the print key PSW is operated upon in the step S303, then the ADF START signal is set to "1". Thus, when the print key PSW is operated upon while the ADF 200 is mounted, and provided the document feed unit 202 has been determined as being opened or opened and closed prior to operation of the print key PSW, then a document is regarded as being placed on the document support table 16 manually by the user, and the copy start signal is immediately set to "1" to start the copying machine 100 as shown in FIG. 12a. However, when a document is set on the document tray 203, and the print key PSW is operated upon regardless of the fact that the document feed unit 202 is not opened and closed, then the print key PSW is regarded as being actuated in error by the user who really wanted to activate the start switch SSW on the ADF 200, and the ADF START signal is set to "1". A process to be followed when the ADF START signal is "1" is shown in FIGS. 14a and 14b.

Steps S307, S308 indicate a process of setting the copy start signal to "1" after the ADF START signal has been set to "1" in the step S304 and then a copy permission signal from the ADF CPU 403 is set to "1". The copy permission signal is issued by the CPU 403 after a document has been fed to the prescribed position in the ADF 200.

FIGS. 12a and 12b shows a detailed copy operation control subroutine corresponding to the step S400 of FIG. 10. The control subroutine will be described also with reference to FIG. 13.

In a block 10, the main motor M1, the development motor M2, the charging charger 3, and the the transfer charger 7 are operated when the copy start flag is set to "1", and the copy start flag is reset to "0". A copy flag indicative of a copying operation is set to "1", control timers T-A, T-B are started, and a clutch for the selected sheet feed rollers is actuated. A process for operating the manual sheet mechanism 30 will be omitted.

In a block 11, the completion of operation of the timer T-A is detected, and the clutch for the sheet feed rollers is inactivated.

In a block 12, the completion of operation of the timer T-B is detected, the scan motor M3 is turned on, and a signal for starting a scanning operation is issued to the CPU 402.

In a block 13, a timing signal issued during the scanning operation is received from the CPU 402 to actuate a timing roller clutch CL1, and a timer T-C is set. A copying sheet is delivered by the timing roller assembly 21 in synchronism with an image on the photosensitive drum 1.

In a block 14, the completion of operation of the timer T-C is detected, and the charging charger, the scan motor, and the timing roller clutch are inactivated. The timer T-C may be variably set dependent on the size of a copying sheet used.

In a block 15, whether a set number of copies are produced or not is determined by a timing at the end of scanning in a successive copying mode, and if not, a timer T-D is set.

In a block 16, the completion of operation of the timer T-D is detected, the charging charger is energized again, the timers T-A, T-B are set, and the selected sheet feed rollers are actuated.

In a block 17, when the optical system is returned to a prescribed position and a detector switch in the prescribed position is turned on, the development motor and the transfer charger 7 are de-energized, the copy flag is reset "0", and a timer T-E is set.

In a block 18, the completion of operation of the timer T-E is detected, and the main motor M is de-energized.

The timers T-A through T-E in FIGS. 12a, 12b, and 13 are digital or software-implemented timers programmed to count up "1" per one routine of operation of the CPU 401 which is executed within a time defined by an internal timer. The times set by these software-implemented timers are stored as numerical data items.

FIGS. 14a and 14b are a flowchart of steps of operation executed by the CPU 403 for controlling the ADF 200. A step S601 effects initialization, and a step S602 enters inputs from switches.

A step S603 determines whether there is a document set on the document tray 203 based on the status of the signal from the sensor SE3. If there is a document, then a step S604 sets a document signal to "1", and if there is not document, then a step S605 resets the document signal to "0", the document signal being delivered to the master CPU 401.

A step S606 determines whether the switch SW1 of the document feed unit 202 is opened or closed. Steps S607, S608 issue signals to the master CPU 401 dependent on the status of the swtich SW1. In response to the applied switch signal, the master CPU 401 determines whether the document feed unit 202 is opened or closed.

A step S609 determines whether the copy start switch SSW of the ADF 200 is depressed or not. If the copy start switch SSW is turned on, then a step S610 determines whether there is a document on the document tray 203 based on an output signal from the sensor SE3. If there is a document, then steps S612, S613 start rotating a document feed roller 205 to feed the document and set a timer A'. If the copy start switch SSW is not depressed, the program proceeds to a step S611 which determines whether the ADF START signal from the master CPU 401 is "1" or not. If the ADF START signal is "1", then the program goes to steps S612, S613.

If the completion of operation of the timer A' is detected in a step S614, then the program goes to steps S615, S616 to stop the feeding of a document and deliver a copy permission signal to the master CPU 401.

A step S617 generally indicates other processes such as a process to be executed in response to operation of the mode setting key 251. A step S618 determines whether the above one subroutine has been completed or not. If one subroutine is completed, then the program goes back to the step S602 to repeat the foregoing process.

With the second embodiment of the present invention, no waste copy will be produced in the ADF mode even if the print key is depressed in error by the user who really wanted to start the ADF, and this advantageous feature can be achieved without complicating the arrangments of the ADF and the copying machine.

Although certain preferred embodiments have been shown and described, it should be understood that many changes and modifications may be made therein without departing from the scope of the appended claims.

What is claimed is:

1. In a copying machine to which an automatic document feeder is attachable, a control apparatus therefor comprising:

first means for providing an input of an operation starting means for initiating a copying operation wherein said operation starting means is provided in said copying machine;

second means for determining that a document to be copied is placed at a document supporting table of the copying machine;

third means for determining whether said automatic document feeder is at a set position or at an open position relative to said document supporting table of the copying machine;

fourth means for determining that a document to be copied is set in said automatic document feeder for feeding onto said document supporting table; and control means responsive to said operation starting means for starting copying operation of the copying machine when the document is determined to be placed at said document supporting table but without operating said automatic document feeder, and for operating said automatic document feeder for feeding the document onto the document supporting table to thereby effect the copying operation when the document to be copied is determined to be set at said automatic document feeder but not at said document supporting table, and for preventing operations of both of said copying machine and automatic document feeder when the document to be copied is determined to be not at the document supporting table as well as at the automatic document feeder.

2. In a copying machine including a document supporting table for supporting thereon a document to be copied and an automatic document feeder attachable to said copying machine for automatically feeding a document onto said document supporting table, a control apparatus therefor comprising:

a copy instruction switch provided on said copying machine;

first means for providing an input of said copy instruction switch for initiating a copying operation;

second means for determining presence of the document on said document supporting table;

third means for determining whether said automatic document feeder is at a set position or at an open position relative to said document supporting table;

fourth means for determining presence of the document on said automatic document feeder for feeding onto said document supporting table; and control means responsive to said first means upon actuation of the copy instruction switch and including first control means for initiating copying operation without operating said automatic document feeder when said second means determines the presence of the document on said document supporting table; second control means for operating said automatic document feeder to feed the document onto said document supporting table so as to initiate copying operation when said fourth means determines the presence of the document on said automatic document feeder but with said second means determining non-presence of the document on said document supporting table; and third control means for preventing operations of both of said copying machine and said automatic document feeder when said second and fourth means respectively determine the non-presence of the document on said document supporting table and on said automatic document feeder.

3. In a copying machine to which an automatic document feeder is attachable, a control apparatus therefor comprising:

a start switch provided on said automatic document feeder for feeding a document onto a document supporting table to thereby initiate copying operation;

first means for providing an input of an operation starting means for initiating copying operation wherein said operation starting means is provided on said copying machine;

second means for determining whether said automatic document feeder is at a set position or at an open position relative to said document supporting table;

third means for determining presence of the document on said automatic document feeder; and control means responsive to said operation starting means and when said third means determines the presence of the document, said control means initiates operation of said automatic document feeder when the same is at said set position and initiates copying operation without operating said automatic document feeder when the same is changed to said open position.

* * * * *